(12) United States Patent
Jeong et al.

(10) Patent No.: US 7,014,154 B2
(45) Date of Patent: Mar. 21, 2006

(54) LCD MONITOR STAND

(75) Inventors: Jun-soo Jeong, Suwon (KR); Hi-taek Lee, Bucheon (KR)

(73) Assignee: Samsung Electronics Co., LTD, Suwon-si (KR)

( * ) Notice: Subject to any disclaimer, the term of this patent is extended or adjusted under 35 U.S.C. 154(b) by 310 days.

(21) Appl. No.: 10/197,333

(22) Filed: Jul. 18, 2002

(65) Prior Publication Data

US 2003/0075649 A1 Apr. 24, 2003

(30) Foreign Application Priority Data

Oct. 24, 2001 (KR) .......................... 2001-65741

(51) Int. Cl.
F16M 11/00 (2006.01)

(52) U.S. Cl. ....................... 248/157; 248/919; 248/920; 248/921; 248/922; 248/923; 248/924; 248/278.1; 248/279.1; 361/681; 361/682; 361/683

(58) Field of Classification Search ................. 361/681, 361/382, 683; 248/157, 278.1, 919, 920, 248/921, 922, 923, 924, 279.1, 274.1, 286.1, 248/291.1, 487, 917, 283.1; 362/681, 682, 362/683
See application file for complete search history.

(56) References Cited

U.S. PATENT DOCUMENTS

| 4,437,638 | A | * | 3/1984 | Scheibenpflug | .......... 248/183.2 |
|---|---|---|---|---|---|
| 5,971,268 | A | * | 10/1999 | Lynch et al. | ................. 235/1 R |
| 6,189,842 | B1 | * | 2/2001 | Bergeron Gull et al. | . 248/125.1 |
| 6,189,849 | B1 | * | 2/2001 | Sweere et al. | ........... 248/286.1 |
| 6,189,850 | B1 | * | 2/2001 | Liao et al. | ............. 248/292.14 |
| 6,229,584 | B1 | * | 5/2001 | Chuo et al. | ................... 349/58 |
| 6,268,997 | B1 | | 7/2001 | Hong | |
| 6,347,433 | B1 | * | 2/2002 | Novin et al. | ................... 16/367 |
| 6,378,830 | B1 | * | 4/2002 | Lu | .......................... 248/278.1 |
| 6,411,271 | B1 | * | 6/2002 | Bang et al. | .................... 345/87 |
| 6,427,288 | B1 | * | 8/2002 | Saito | .......................... 16/361 |
| 6,443,408 | B1 | * | 9/2002 | Hung | ..................... 248/176.1 |
| 6,484,994 | B1 | * | 11/2002 | Hokugoh | .................... 248/371 |
| 6,510,049 | B1 | * | 1/2003 | Rosen | ........................ 361/681 |

FOREIGN PATENT DOCUMENTS

KR 20-0197409 7/2000

* cited by examiner

Primary Examiner—Kimberly T. Wood
(74) Attorney, Agent, or Firm—Staas & Halsey LLP

(57) ABSTRACT

An LCD monitor stand includes a base part, a stand part to stand on the base part and having a cable accommodating part to accommodate cables therein, a hinge shaft positioned across a standing direction of the stand part, a first rotation member to rotate up and down on the hinge shaft, and a second rotation member rotatably coupled to the first rotation member, to rotate the LCD monitor in a planar direction. With this configuration, it is possible to apply tilting and pivoting structures to the internal cable type LCD monitor.

13 Claims, 10 Drawing Sheets

LCD MONITOR STAND

BACKGROUND OF THE INVENTION

1. Field of the Invention

The present invention relates in general to an LCD monitor stand, and more particularly, to an LCD monitor stand having an internal cable.

2. Description of the Related Art

An LCD monitor stand supporting an LCD monitor is classified into an external cable type and an internal cable type. As shown in FIG. 8, an external cable type LCD monitor stand 101 has a tilt member 115 and a pivot member 117, which are disposed between a main body 105 and an LCD monitor (such as the LCD monitor 3 shown in FIG. 1). The tilt member 115 is installed at the upper part of the main body 105 and rotates up and down about a first horizontal axis. The pivot member 117 is combined to the LCD monitor 3 and rotates against the tilt member 115 about a second horizontal axis perpendicular to the first horizontal axis. As the tilt member 115 and the pivot member 117 rotate, the angle of the LCD monitor 3 can be vertically and horizontally adjusted.

However, in this configuration, because a cable that allows communication between the LCD monitor 3 and a computer (not shown), a power cable, and other similar components are exposed to the outside, there are problems that the cables disturb the angle adjustment of the LCD monitor 3 and deteriorate the external simplicity of the LCD monitor 3.

SUMMARY OF THE INVENTION

Accordingly, the present invention has been made keeping in mind the above-described and other shortcomings and the needs of the users, and an object of the present invention is to provide an internal cable type LCD monitor stand having a simple pivoting and tilting structure which can adjust an angle of an LCD monitor easily.

Additional objects and advantages of the invention will be set forth in part in the description which follows and, in part, will be obvious from the description, or may be learned by practice of the invention.

This and other objects of the present invention may be accomplished by an embodiment of the present invention in which an LCD monitor stand includes a base part, a stand part to stand on the base part and to have a cable accommodating part to accommodate cables therein, a hinge shaft positioned across a standing direction of the stand part, a first rotation member rotating up and down on the hinge shaft, and a second rotation member rotatably coupled to the first rotation member, and rotating the LCD monitor in a planar direction.

According to an aspect of the invention, the first rotation member includes a cable through-hole through which the cables are passed, thereby effectively hiding the cables.

According to another aspect of the invention, the second rotation member includes a first rotation pipe rotatably inserted into the cable through-hole of the first rotation member, and a second rotation pipe rotatably combined to the first rotation pipe, and supporting the LCD monitor, the first rotation pipe including an outside flange outwardly protruding from one end thereof, and the second rotation pipe including an inside flange engaged with the outside flange of the first rotation pipe, and further comprising a stop washer positioned on a part of the first rotation pipe and jutting beyond the rear of the first rotation member.

According to yet another aspect of the invention, the LCD monitor stand further includes a rotation angle restricting unit disposed between the first rotation member and the second rotation pipe, to restrict the rotation of the second rotation pipe within a predetermined angle, wherein the rotation angle restricting unit includes a ring shaped rotation-restricting member having a pair of holding parts at the outer circumference thereof, and engaged with the second rotation pipe to rotate with the second rotation pipe, and a stopper provided at the first rotation member, and interposed between the pair of holding parts of the rotation-restricting member.

According to still another aspect of the invention, the stand part includes a lower casing and an upper casing accommodated in the lower casing and moving up and down therein to adjust the height of the LCD monitor.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE EMBODIMENTS

Figure 1:
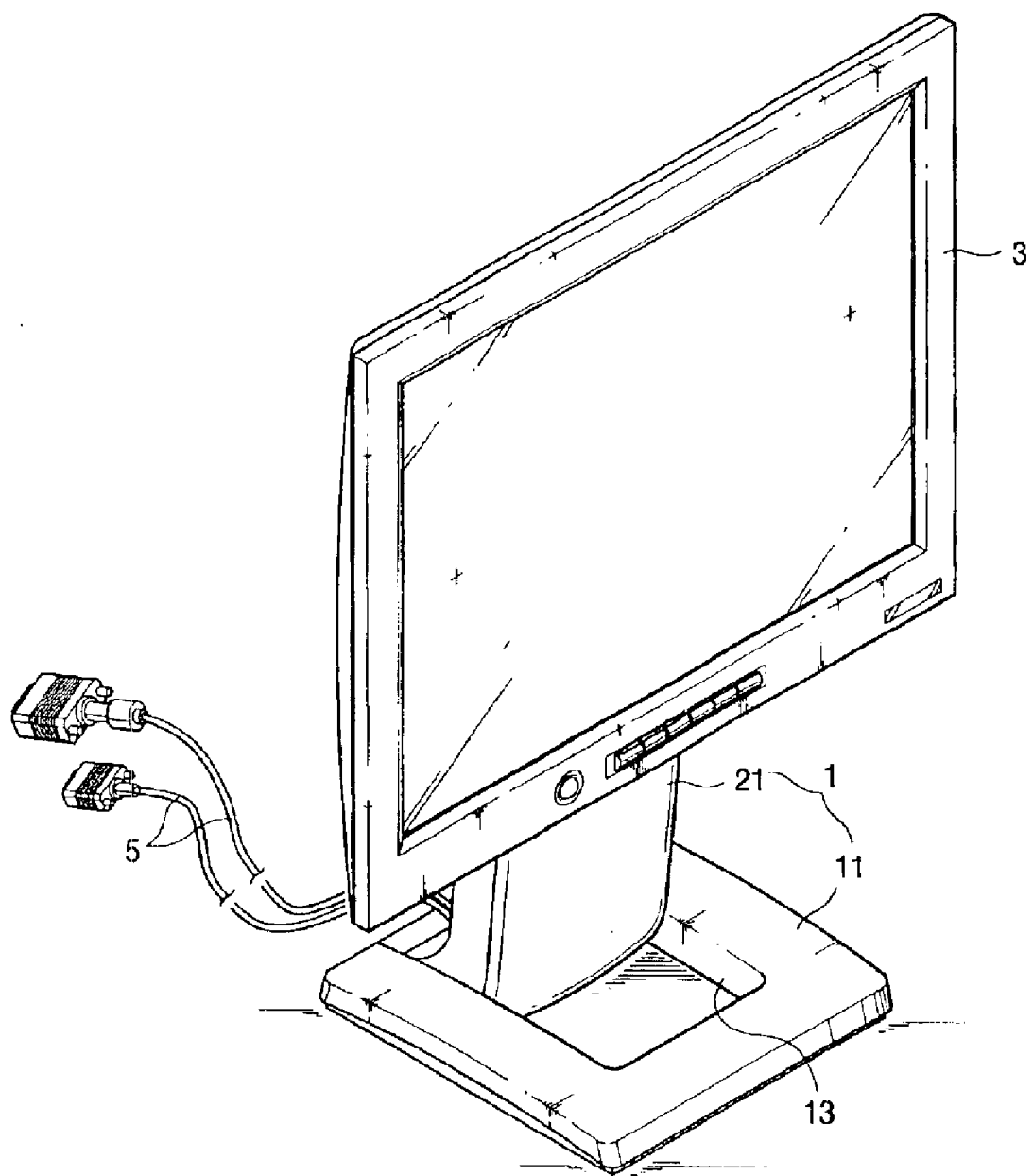
FIG. 1 is a perspective view of an LCD monitor stand according to an embodiment of the present invention, wherein the LCD monitor stand is coupled to an LCD monitor.

Embodiments of the present invention will be described in more detail with reference to the accompanying drawings, wherein like reference numerals refer to the like elements throughout.

Figure 2:
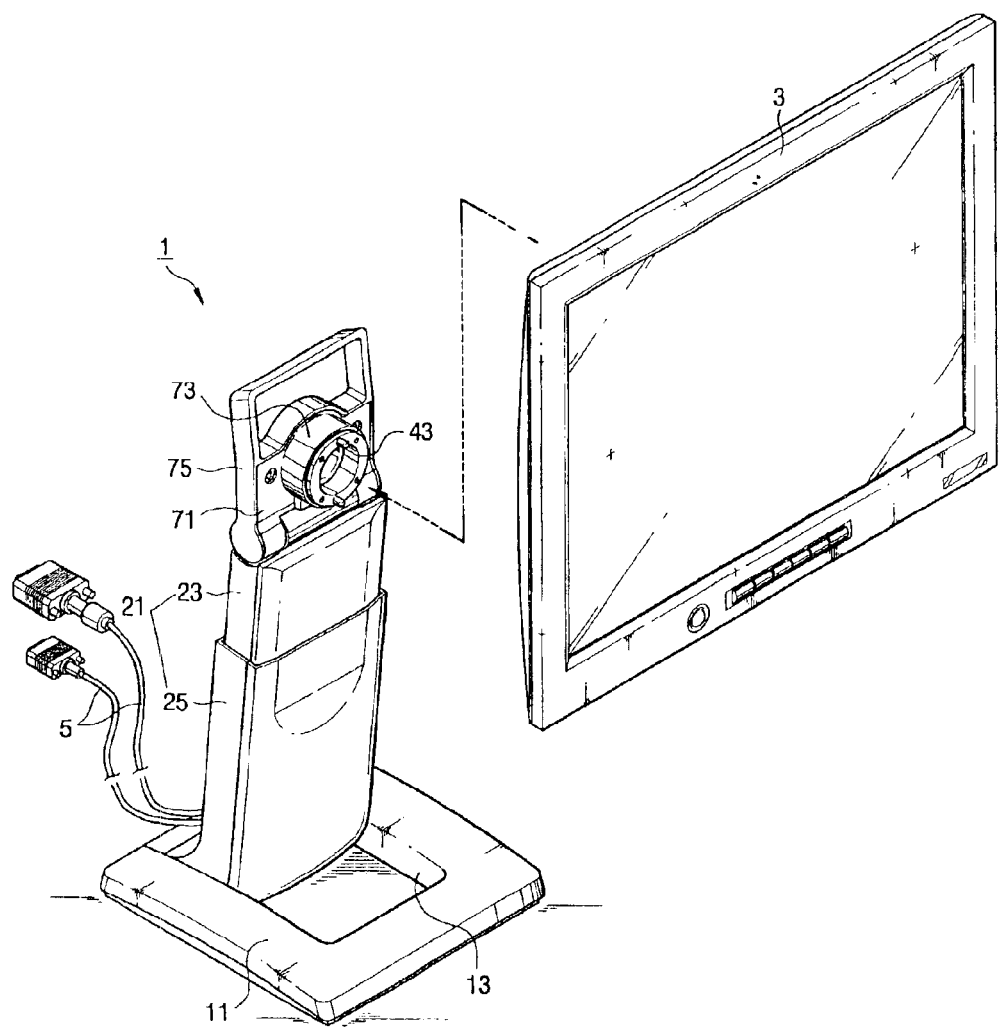
FIG. 2 is a partial exploded perspective view of the LCD monitor stand of FIG. 1, wherein the LCD monitor stand is separated from the LCD monitor.
Figure 4:
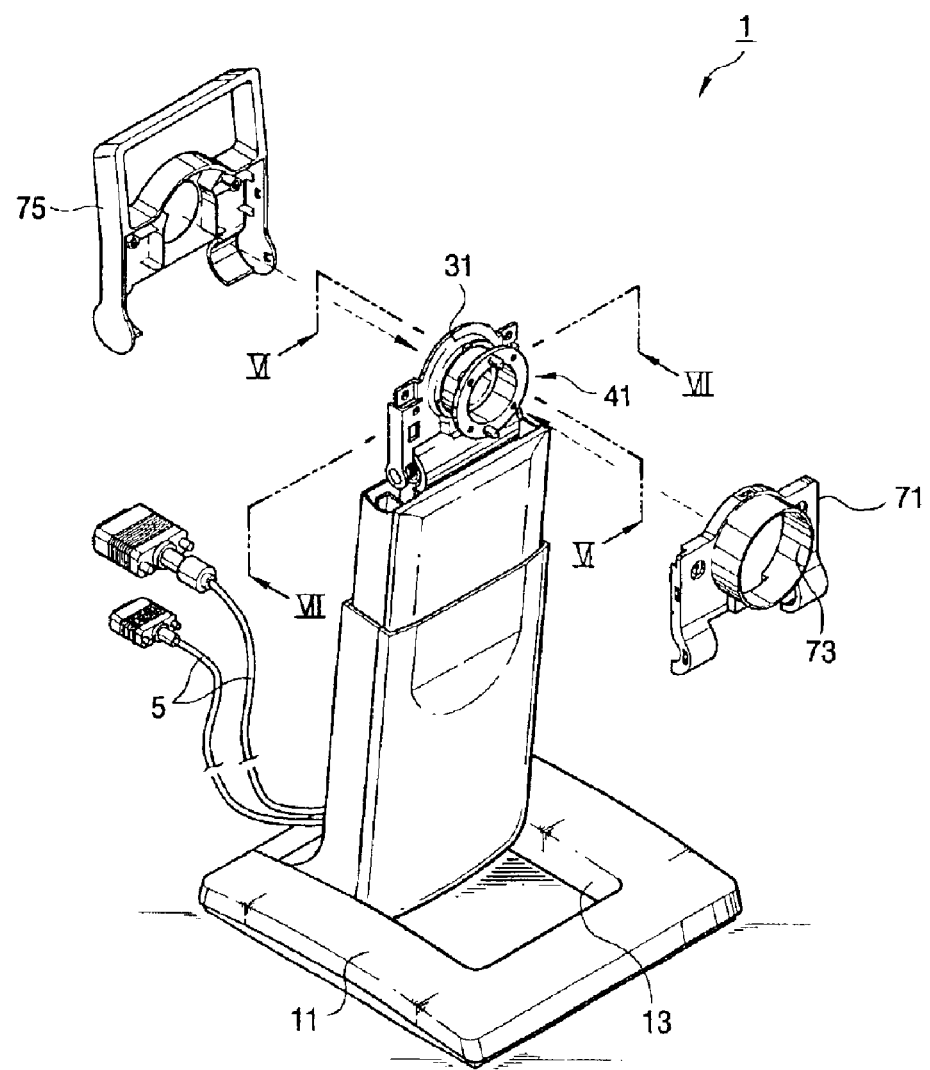
FIG. 4 is a partial exploded perspective view of the LCD monitor stand of FIG. 2.

As shown in FIGS. 1 and 2, an LCD monitor stand 1 according to an embodiment of the present invention includes a base part 11 and a stand part 21 that supports the LCD monitor 3. Further, as shown in FIG. 4, the LCD monitor stand 1 additionally comprises a first rotation member 31 to allow vertical rotation about a first horizontal axis, and a second rotation member 41 to allow planar rotation about an axis of rotation. The first and second rotation members 31 and 41 are installed at an upper end part of the stand part 11.

The base part 11 has a generally rectangular shape, and has an opening 13 at the center area thereof. At the rear of the opening 13 is mounted the stand part 21. Further, on the bottom of the base part 11 is provided a swivel device (not shown) to allow the base part 11 to swivel. However, it is understood that other shapes could be used, such as an oval or a multi-sided shape.

Figure 5:
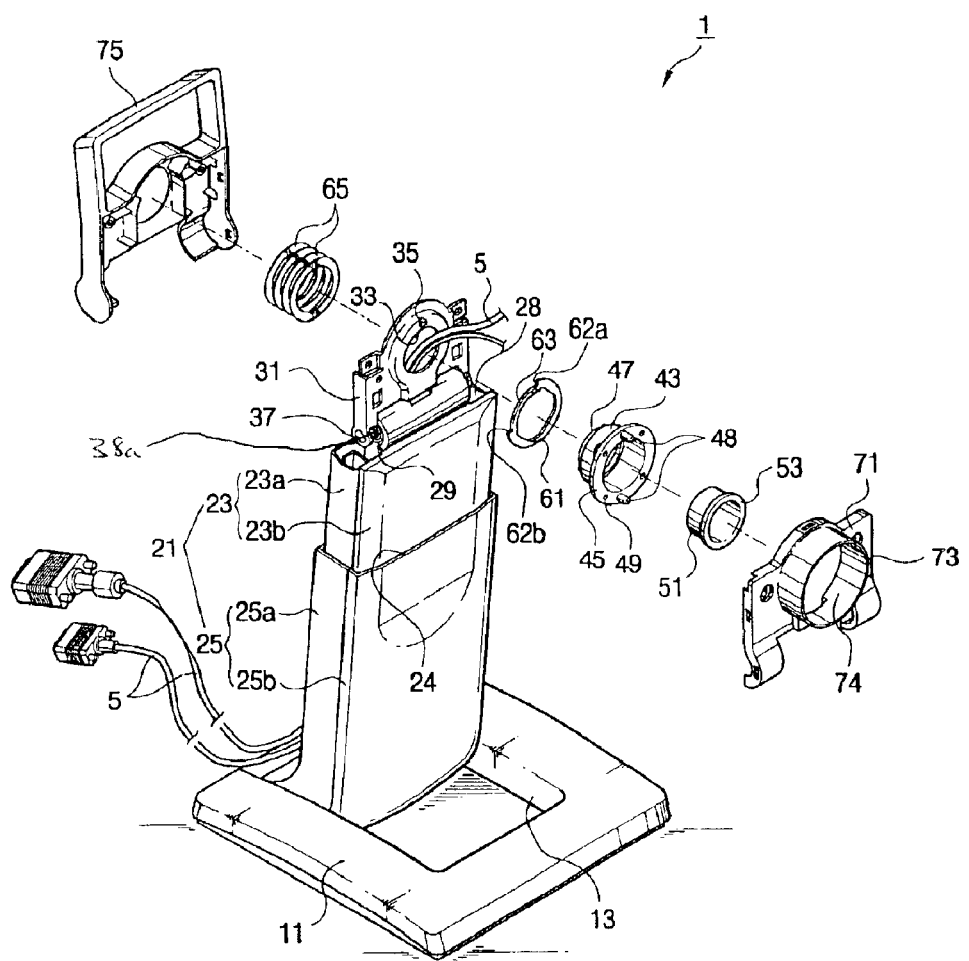
FIG. 5 is a detailed partial exploded perspective view of the LCD monitor stand of FIG. 4.

The stand part 21 is generally prismatic with a rectangular cross section. The stand part 21 is separated into an upper casing 23 and a lower casing 25. The upper casing 23 has a size proper to be accommodated in the lower casing 25. The upper casing 23 moves up and down while being accommodated in the lower casing 25 in a telescoping fashion. As shown in FIG. 5, the upper casing 23 and the lower casing 25 have main casings 23a and 25a, and front casings 23b and 25b combined to the main casings 23a and 25a, respectively. Inside the casings 23 and 25 are accommodated cables 5 needed for the LCD monitor 3. It is understood that the stand part 21 can have other shapes, such as a tubular shape, and that the stand part 21 need not have the same shape as the base part 11. Further, the lower casing 25 could instead fit within the upper casing 23 in a similar telescoping fashion Further, it is understood that the upper and lower casings 23 and 25 could also be a single unit such that the stand part 21 does not extend vertically in a telescoping fashion.

The lower casing 25 is combined at the lower part thereof with the rear part of the opening 13 provided at the center area of the base part 11. Herein, the base part 11 and the lower casing 25 may be manufactured as one body according to an embodiment of the invention, but can also be manufactured separately.

Figure 3:
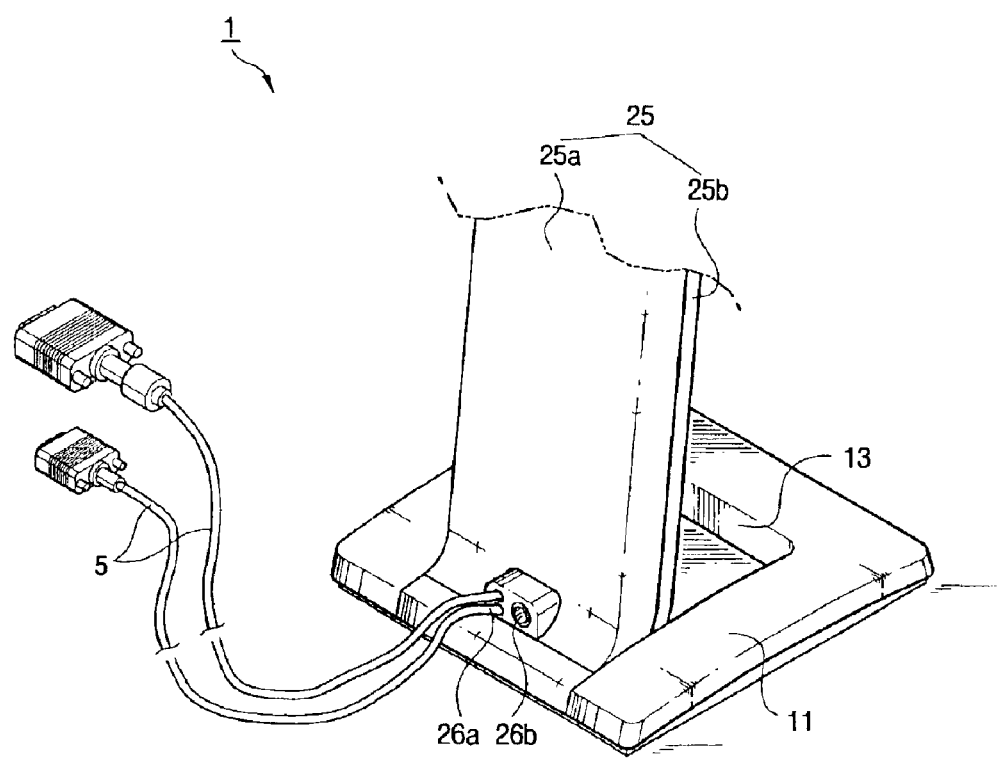
FIG. 3 is a view illustrating the rear of the LCD monitor stand of FIG. 2.

At the upper part of the lower casing 25 is provided an entrance 24 that allows the upper casing 23 to move up and down there through. Further, as shown in FIG. 3, at the rear lower part of the lower casing 25 are a pair of through holes 26A and 26B through which the cables 5 are passed. Here, through the through hole 26A may be passed the pair of communication cables 5, and through the other through hole 26B may be passed a power cable (not shown). It is understood other cables may be used, such as cables leading to speakers or other accessories that can be attached to the LCD monitor 3.

At the upper and lower parts of the upper casing 23, which is hollow, are provided an upper opening 28 and a lower opening (not shown), respectively. At the upper opening 28 is provided a hinge shaft 29 in a lengthwise direction of the upper opening 28. The hinge shaft 29 is rotatably combined at a hinge hole 38a (shown in FIG. 7) of the first rotation member 31 so as to rotate about a horizontal axis (i.e., vertically). The lower opening (not shown) is communicated with the inside of the lower casing 25, and allows the cables 5 to pass there through.

Figure 9:
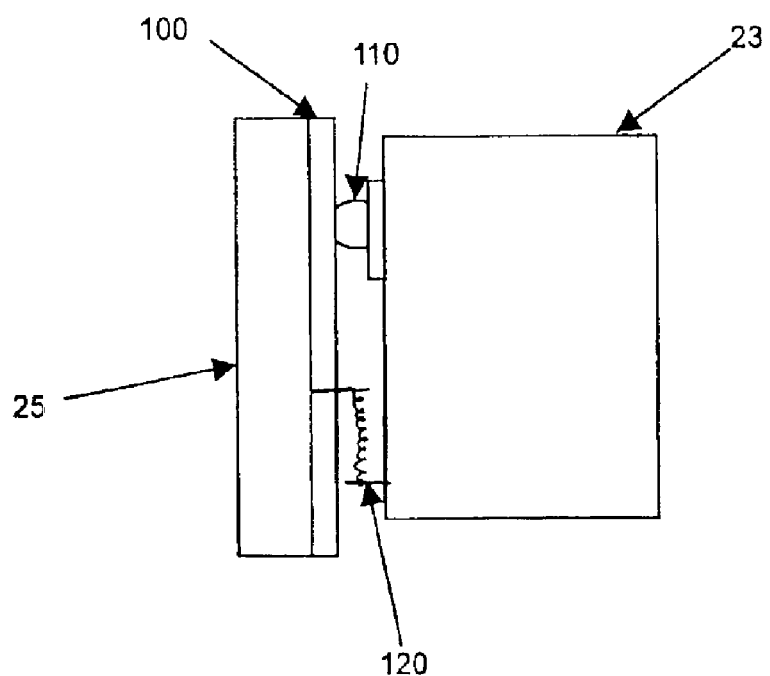
FIG. 9 is a sectional view of a movement control device according to an embodiment of the invention.

The up and down movement of the upper casing 23 may be controlled using a known movement control device. According to the embodiment of the movement control device shown in FIG. 9, guides 100 are provided on both sides of an inside wall of the lower casing 25, respectively. Rollers 110 are installed on both sides of an outside wall of the upper casing 23, and move along the guides 100 of the lower casing 25. A spring 120 is interposed between the upper casing 23 and the lower casing 25, and elastically biases the upper casing 23. Thus, the height of the LCD monitor 3 can be adjusted. Herein, the guides 100 and the rollers 110 may be provided on the upper casing 23 and the lower casing 25, respectively according to other embodiments of the invention.

While not shown, it is understood that other movement control devices could be used, such as those that utilize gears or hydraulics. However, where the height of the LCD monitor 3 is not adjustable, it is understood that the movement control device would not be used. In this embodiment, the casings 23, 25 can be formed as a single body.

Figure 7:
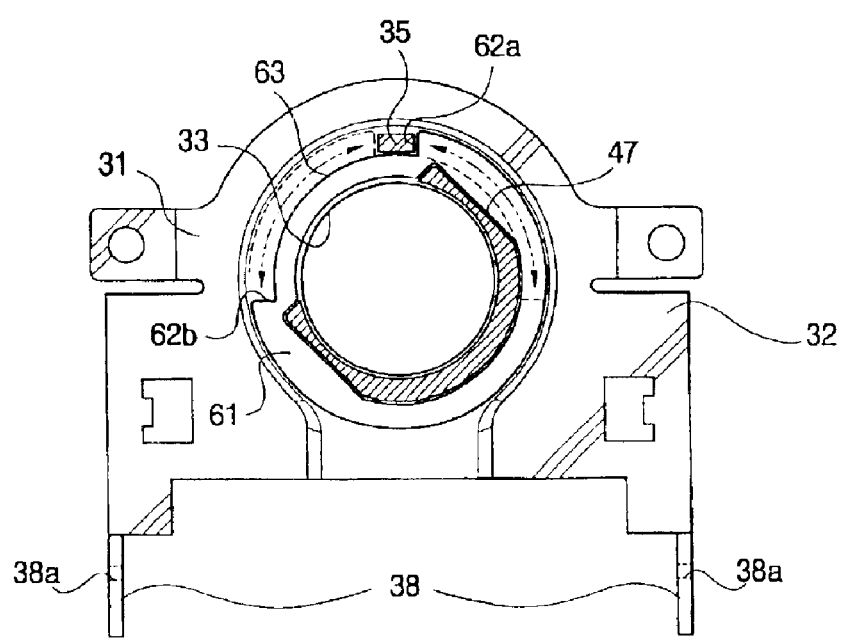
FIG. 7 is an enlarged sectional view taken along line VII—VII in FIG. 4, wherein the rotating movement of the second rotation member is illustrated.
Figure 8:
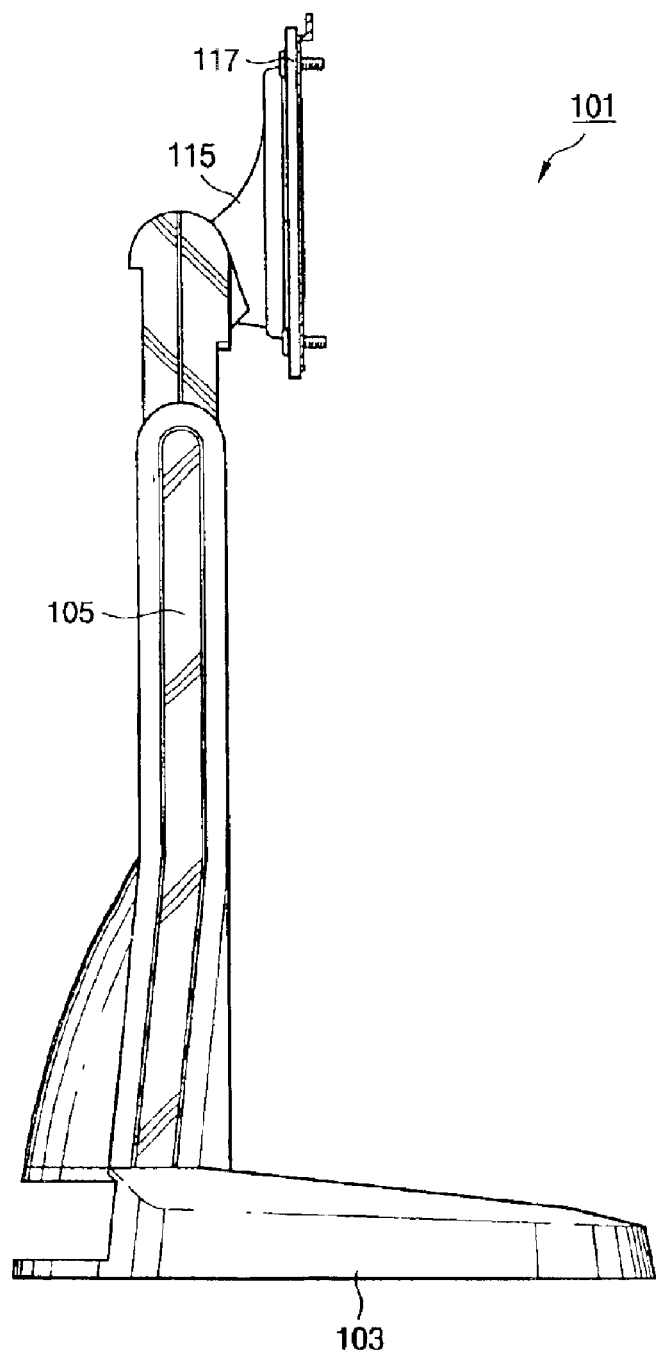
FIG. 8 is a perspective view of the conventional LCD monitor stand.

Referring to FIGS. 4, 5 and 7, the configuration of the first rotation member 31 and the second rotation member 41, installed at the upper part of the stand part 21, will be described herein below. The first rotation member 31 includes a main body 32 approximately of a rectangular shape, and hinge parts 38 protruding from opposite lower edges thereof. Each hinge part 38 includes a hinge hole 38a. The hinge hole 38a is coupled to the hinge shaft 29 provided at the upper casing 23. Thus, the first rotation member 31 rotates about the hinge shaft 29. The free rotation of the first rotation member 31 is restricted by a spring 37 combined to the hinge shaft 29 of the upper casing 23.

At a center of the first rotation member 31 is provided a cable through hole 33. The cable through hole 33 allows the cables 5 from the LCD monitor 3 to pass through the stand part 21 and through the through hole 33 of the first rotation member 31 as shown in FIG. 5. The through hole 33 rotatably accommodates a first rotation pipe 51 of the second rotation member 41 therein. A stopper 35 protrudes from the front surface of the first rotation member 31 above the cable through hole 33. The stopper 35 restricts a rotation of a second rotation pipe 43 of the second rotation member 41 to stay within a predetermined angle.

The second rotation member 41 includes the second rotation pipe 43 positioned in front of the cable through hole 33. The first rotation pipe 51, which is accommodated in the cable through hole 33, rotates together with the second rotation pipe 43 so as to provide planar rotation. A stop washer 65 attaches the first rotation pipe 51 to the first rotation member 31 while allowing the planar rotation.

Figure 6A:
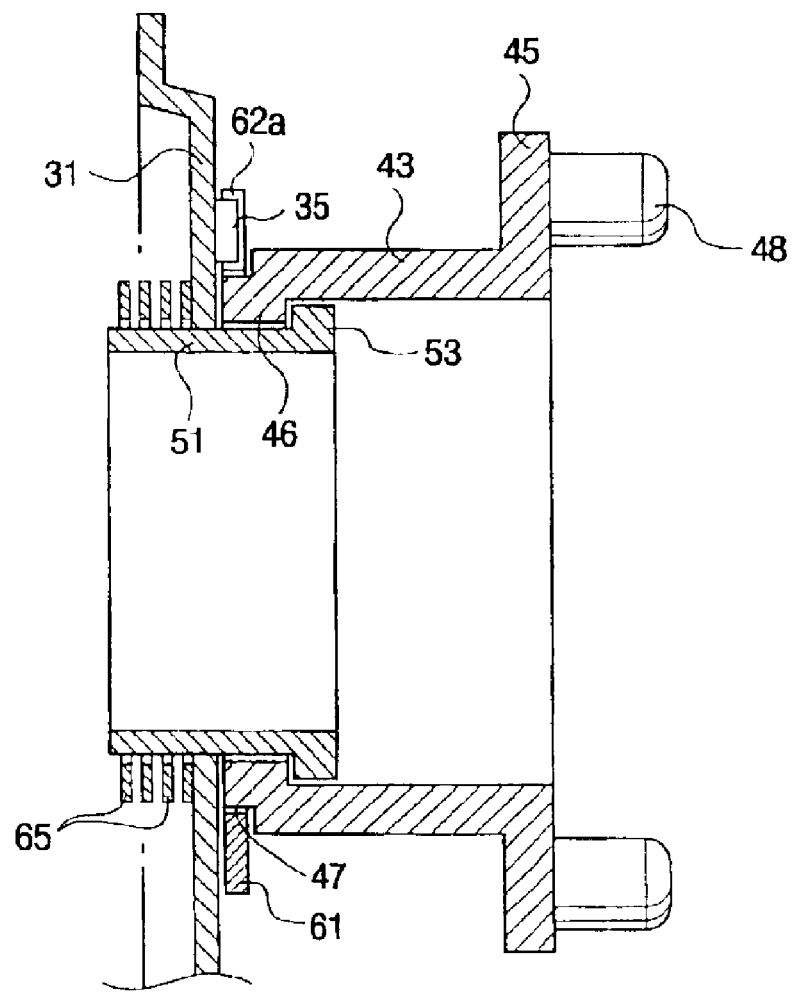
FIGS. 6A and 6B are enlarged sectional views taken along line VI—VI in FIG. 4, wherein the configuration of the second rotation member is illustrated in more detail.
Figure 6B:
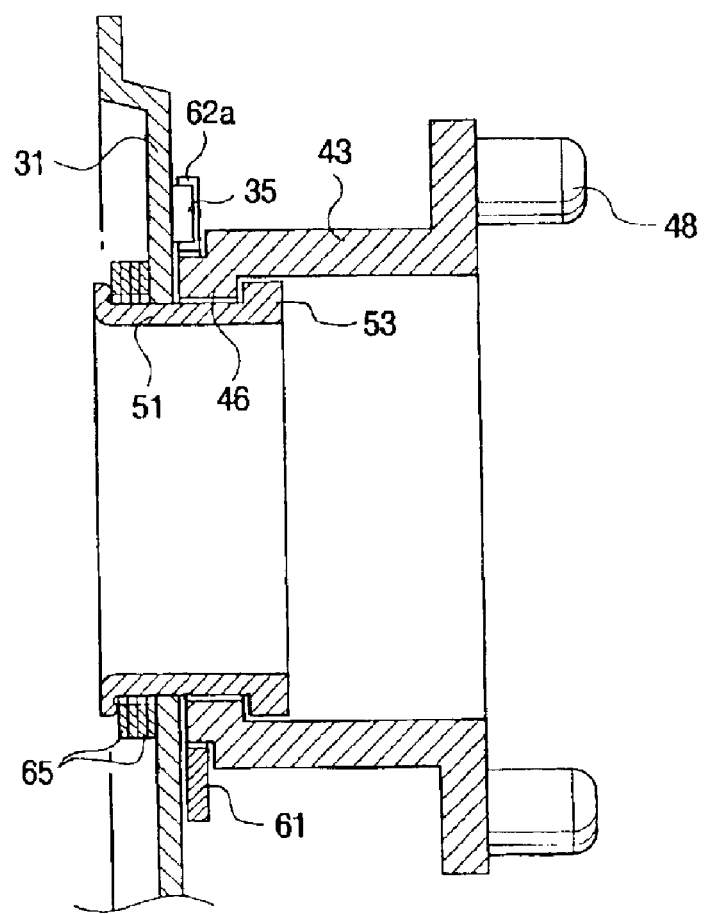

As shown in FIGS. 6A, 6B, and 7, the second rotation pipe 43 has a pipe shape. A minimum inner diameter of the second rotation pipe 43 is greater than or equal to a diameter of the cable through hole 33. At a rear end of the second rotation pipe 43 is provided an inside flange 46 that protrudes inwardly. Herein, it is desirable that the inner diameter of the inside flange 46 is equal to that of the cable through hole 33, however other diameters are possible. Further, at the rear end of the second rotation pipe 43 is provided a pair of flat parts 47 formed in parallel at opposite sides of the outer circumference of the second rotation pipe 43.

A rotation-restricting member 61 is combined with the flat parts 47 of the second rotation pipe 43. The rotation-restricting member 61 restricts a rotation of the second rotation pipe 43 within a predetermined angle, in cooperation with the stopper 35. The rotation-restricting member 61 is approximately of a circular ring shape, and has an inner circumference that corresponds to an outer circumference of the second rotation pipe 43. Thus, the second rotation pipe 43 can be rotated by gearing with the rotation-restricting member 61.

The outer circumference of the rotation-restricting member 61 is formed with a cutoff part 63 of a predetermined length. Due to the cutoff part 63, at the outer circumference of the rotation restriction member 61 are provided a pair of holding parts 62a and 62b. Thus, the rotation of the second rotation pipe 43 and the rotation-restricting member 61 can be restricted within a predetermined angle by restricting the movement of the stopper 35 of the first rotation member 31 between the holding parts 62a and 62b.

At a front end of the second rotation pipe 43 is provided an outside flange 45. On a front surface of the front flange 45 are provided a pair of projections 48, at opposite positions thereof. The projections 48 are accommodated in grooves (not shown) provided at a rear of the LCD monitor 3. Further, on the front flange 45 are provided a plurality of holes 49 at regular intervals. Into the holes 49 are inserted fixing members (not shown), passing through the rear of the LCD monitor 3.

The first rotation pipe 51 is also of a pipe shape of a predetermined length and is inserted into the second rotation pipe 43. It is desirable that the outer diameter of the first rotation pipe 51 is smaller than the inner diameter of the inside flange 46 of the second rotation pipe 43, however other diameters are possible. At a front end of the first rotation pipe 51 is provided an outside flange 53. The outside flange 53 is slideably engaged with the inside flange 46 of the second rotation pipe 43 when the first rotation pipe 51 is inserted into the second rotation pipe 43.

The stop washers 65 are of a circular ring shape, and are engaged with a rear end part of the first rotation pipe 51 at the rear part of the first rotation member 31, thereby preventing the first rotation pipe 51 from detaching from the first rotation member 31. While multiple stop washers 65 are shown, it is understood that a single stop washer 65 or other similar restraining device could be used to keep the first rotation part 51 from detaching from the first rotation member 31.

With this configuration, the process of combining the second rotation member 41 to the first rotation member 31 will be described. First, the first rotation pipe 51 is accommodated in the second rotation pipe 43. A rear end part of the first rotation pipe 51 juts beyond the rear of the second rotation pipe 43. Then, the second rotation pipe 43 is inserted into the rotation-restricting member 61. Thereafter, the jutting rear part of the first rotation pipe 51 is accommodated in the cable through hole 33 of the first rotation member 31. A part of the rear of the first rotation pipe 51 juts beyond the rear of the first rotation member 31. At this time, the stopper 35 of the first rotation member 31 is positioned between the holding parts 62a and 62b formed by the cutoff part 63 of the rotation-restricting member 61.

Thereafter, as shown in FIG. 6A, the stop washers 65 are arranged on the rear end of the first rotation pipe 51, which juts beyond the rear of the first rotation member 31. Thereafter, as shown in FIG. 6B, the rear end of the first rotation pipe 51 is bent outwardly. Thus, the first rotation pipe 51 is rotatably inserted in the cable through hole 33 of the first rotation member 31 without breaking away, so that the second rotation member 41 is combined to the first rotation member 31. At this time, the second rotation pipe 43 can rotate relatively to the first rotation pipe 51 while allowing a cable 5 to pass through the axis of rotation.

On the other hand, as shown in FIGS. 4 and 5, the assembled second rotation member 41 is covered with hinge cases 71 and 75. The hinge cases 71 and 75 have a rear cover 75 and a front cover 71. On the front cover 71 is provided a second rotation pipe hole 74 through which the second rotation pipe 43 is passed. At the brim of the second rotation pipe hole 74 is provided a skirt part 73 that protrudes forward. Herein, the rear cover 75 and the front cover 71 can be combined together using a hook structure.

The LCD monitor 3 is combined with the front of the second rotation member 41, which is covered with the hinge cases 71 and 75. Specifically, the LCD monitor 3 is attached to the front of the second rotation pipe 43. The combination of the LCD monitor 3 and the second rotation pipe 43 is accomplished by inserting the projections 48 of the second rotation pipe 43 into grooves provided at the rear of the LCD monitor 3, and then by fastening the plurality of fixing members into the holes 49 of the second rotation pipe 43, through the rear of the LCD monitor 3.

With this configuration, the height and the angle of the LCD monitor 3 can be adjusted by using the LCD monitor stand 1 according to the present invention, in the following manner. First, the height of the LCD monitor 3 can be adjusted by moving the upper casing 23 up and down within the lower casing 25. The upper casing 23 is positioned in place by the weight of the LCD monitor 3. The vertical and planar rotation angles of the LCD monitor 3 can be adjusted using the first rotation member 31. The vertical rotation angle is adjusted by turning the first rotation member 31 on the hinge shaft 29 about a horizontal axis, and the planar rotation angle is adjusted by rotating the second rotation member 41 relative to the first rotation member 31 about an axis of rotation. Further, the cable 5 passes internally through the stand 21 and, through the first and second rotation members 31, 41 near the axis of rotation so as to attach to the LCD monitor 3.

As described above, according to the present invention, there is provided an internal cable type LCD monitor which is capable of easily adjusting vertical and lateral angles of an LCD monitor. Further, the height of the LCD monitor can be adjusted by moving up and down an upper casing against a lower casing of a stand part. While the present invention has described for use with an LCD monitor, it is understood that the stand could be used with other types of display apparatuses, such as a flat panel display such as plasma display panels, LEDs and OLEDs, or any input/output device using cables and that is positioned on a stand.

Although the embodiments of the present invention have been disclosed for illustrative purpose, those skilled in the art will appreciate that various modifications, additions and substitutions are possible, without departing from the scope and spirit of the invention as disclosed in the accompanying claims and equivalents thereof.

What is claimed is:

1. An LCD monitor stand to hold an LCD monitor connected to a cable, comprising:
 a base part;
 a stand part disposed on said base part and having a cable accommodating part within said stand part such that the cable extends through said stand part;
 a hinge shaft positioned across said stand part;
 a first rotation member that rotates the LCD monitor about a horizontal axis using said hinge shaft; and
 a second rotation member rotatably coupled to said first rotation member, wherein:
  said second rotation member rotate the LCD monitor in a planar direction about an axis of rotation,
  second rotation member comprises a through hole including the axis of rotation and through which the cable passes internally from the cable accommodating part to the LCD monitor,
  said first rotation member includes a cable through hole through which the cable is passed to the through hole of said second rotation member,
  said second rotation member includes,
   a first rotation pipe rotatably inserted into the cable through hole of said first rotation member; and
   a second rotation pipe rotatably combined to the first rotation pipe and including the through hole of said second rotation member, the second rotation pipe supporting the LCD monitor, and the cable passes through said stand part, said first rotation member, and through the first and second rotation pipes to the LCD motion.

2. The LCD monitor stand according to claim 1, wherein the first rotation pipe comprises an outside flange that protrudes outwardly away from the center of the first rotation pipe at a front end, and the second rotation pipe is formed with an inside flange engaged with the outside flange of the first rotation pipe so as to rotatably slide within the second rotator pipe; and said LCD monitor stand further comprises a stop washer positioned on a part of the first rotation pipe that juts beyond the rear of the first rotation member.

3. The LCD monitor stand according to claim 1, further comprising a rotation angle restricting unit disposed between said first rotation member and the second rotation pipe, said rotation angle restricting unit to restrict a rotation of the second rotation pipe to remain within a predetermined angle.

4. The LCD monitor stand according to claim 2, further comprising a rotation angle restricting unit disposed between said first rotation member and the second rotation pipe, said rotation angle restricting angle unit to restrict a rotation of the second rotation pipe to remain within a predetermined angle.

5. The LCD monitor stand according to claim 3, wherein said rotation angle restricting unit includes:
  a ring shaped rotation-restricting member having a pair of holding parts at an outer circumference thereof, the holding parts being engaged with the second rotation pipe to rotate with the second rotation pipe, and
  a stopper provided at said first rotation member and interposed between the pair of holding parts so to restrict the rotation of the second rotation pipe.

6. The LCD monitor stand according to claim 4, wherein said rotation angle restricting unit includes:
  a ring shaped rotation-restricting member having a pair of holding parts at an outer circumference thereof, the holding parts being engaged with the second rotation pipe to rotate with the second rotation pipe; and
  a stopper provided at said first rotation member and interposed between the pair of holding parts so as to restrict the rotation of the second rotation pipe.

7. The LCD monitor stand according to claim 1, wherein said stand part includes:
  a lower casing; and an upper casing accommodated in the lower casing and moving relative to the lower casing.

8. The LCD monitor stand according to claim 7, wherein said stand part further campuses a movement control device to control the relative movement of the lower casing and the upper casing.

9. An LCD monitor stand to hold an LCD monitor connected to a cable, comprising:
  a base part;
  a stand part disposed on said base part and having a cable accommodating port within said stand port such that the cable extends through said stand part;
  a hinge shaft positioned across said stand part;
  a first rotation member that rotates the LCD monitor about a horizontal axis using said hinge shaft; and
  a second rotation member rotatably coupled to said first rotation member,
  wherein:
    said second rotation member rotates the LCD monitor in a planar direction about an axis of rotation,
    said second rotation member comprises through hole including the axis of rotation and through which the cable passes internally from the cable accommodating part to the LCD monitor,
  said stand part includes:
    a lower casing; and
    an upper casing accommodated in the lower casing and moving relative to the lower casing,
  said stand part further comprises a movement control device to control the relative movement of the lower casing and the upper casing, and
  the movement control device comprises:
    a roller on one of the upper and lower casing,
    a track on the other of the upper and lower casing, the track to receive end guide the roller, and
    a spring to bias the relative movement of the upper and lower against a weight of the LCD monitor.

10. A method of assembling a display apparatus including a display monitor having a cable and a monitor stand, comprising:
  attaching a base part having a base through hole to a stand part and having a stand through hole;
  attaching a met rotation part to a hinge of the stand part so that the first rotation part rotates about a first axis relative to the stand part, the first rotation part having a rotation part through hole;
  placing a first rotation pipe in a second rotation pipe such that a rear part of the first rotation pipe extends beyond a rear end of the second rotation pipe and such that the first rotation pipe rotates relative to the second rotation pipe;
  placing the rear part of the first rotation pipe in the rotation part through hole so as to secure the first and second rotation pipe to the first rotation part while allowing the first rotation pipe to rotate relative to the second rotation pipe about a second axis of rotation;
  attaching the second rotation pipe to the display monitor, where the signals or power are provided to the display monitor through the cable; and
  threading the cable through the base through hole, the stand through hole, the rotation part through hole, and through the first and second rotation pipes to be attached to the display monitor.

11. The method according to claim 10, further comprising attaching hinge case to cover the first rotation part and the first and second pipes after the first and second pipes are secured to the first rotation part.

12. The method according to claim 10, wherein said attaching the second rotation pipe to the display monitor comprises:
  inserting projections of the second rotation pipe into grooves at a rear of the display monitor, and
  fastening fixing members into holes in the rear of the display monitor.

13. The method according to claim 10, wherein said placing the rear part of the first rotation pipe in the rotation part through hole comprises:
  attaching a stop washer to the rear part of the first rotation pipe extending through the rotation member through hole, and
  bending the rear end of the first rotation pipe bent outwardly.

* * * * *

UNITED STATES PATENT AND TRADEMARK OFFICE
CERTIFICATE OF CORRECTION

PATENT NO.       : 7,014,154 B2
APPLICATION NO.  : 10/197333
DATED            : March 21, 2006
INVENTOR(S)      : Jun-soo Jeong et al.

It is certified that error appears in the above-identified patent and that said Letters Patent is hereby corrected as shown below:

On the TITLE page, (73) Assignee, change "LTD," to --LTD.--

Column 6, line 53, before "second" insert --said--

Column 6, line 60, change "includes," to --includes:--

Column 6, line 51, change "rotate" to --rotates--

Column 7, line 3, change "motion" to --monitor--

Column 7, line 33, after "so" insert --as--

Column 7, line 49, change "campuses" to --comprises--

Column 7, line 56, change "port" to --part--

Column 7, line 56, change "port" second occurrence to --part--

UNITED STATES PATENT AND TRADEMARK OFFICE
CERTIFICATE OF CORRECTION

PATENT NO. : 7,014,154 B2
APPLICATION NO. : 10/197333
DATED : March 21, 2006
INVENTOR(S) : Jun-soo Jeong et al.

It is certified that error appears in the above-identified patent and that said Letters Patent is hereby corrected as shown below:

Column 8, line 1, after "comprises" insert --a--

Column 8, line 15, change "end" to --and--

Column 8, line 23, change "met" to --first--

Column 8, line 34, change "pipe" to --pipes--

Column 8, line 53, change "case" to --cases--

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,014,154 B2 | Page 1 of 1 |
| APPLICATION NO. | : 10/197333 | |
| DATED | : March 21, 2006 | |
| INVENTOR(S) | : Jun-soo Jeong et al. | |

It is certified that error appears in the above-identified patent and that said Letters Patent is hereby corrected as shown below:

Column 8, line 45, change "case" to --cases--

Signed and Sealed this

Twentieth Day of February, 2007

JON W. DUDAS
*Director of the United States Patent and Trademark Office*